United States Patent
Ike et al.

(10) Patent No.: US 12,257,789 B2
(45) Date of Patent: Mar. 25, 2025

(54) METHOD FOR MANUFACTURING JOINED BODY

(71) Applicant: TOYOTA JIDOSHA KABUSHIKI KAISHA, Toyota (JP)

(72) Inventors: Takashi Ike, Miyoshi (JP); Tatsuya Kojima, Okazaki (JP); Natsuhiko Katahira, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 60 days.

(21) Appl. No.: 18/310,661

(22) Filed: May 2, 2023

(65) Prior Publication Data
US 2024/0025136 A1    Jan. 25, 2024

(30) Foreign Application Priority Data
Jul. 19, 2022   (JP) ............................. 2022-114536

(51) Int. Cl.
*B29C 70/68*  (2006.01)
*B29C 70/48*  (2006.01)
*B29K 105/00* (2006.01)
*B29K 105/08* (2006.01)
*B29L 31/30*  (2006.01)

(52) U.S. Cl.
CPC .......... *B29C 70/48* (2013.01); *B29C 70/682* (2013.01); *B29K 2105/0097* (2013.01); *B29K 2105/0872* (2013.01); *B29L 2031/3085* (2013.01)

(58) Field of Classification Search
CPC ..... B29C 70/46; B29C 70/462; B29C 70/446; B29C 70/34; B29C 70/342; B29C 70/345
See application file for complete search history.

(56) References Cited

U.S. PATENT DOCUMENTS

| | | | | |
|---|---|---|---|---|
| 3,873,654 A | * | 3/1975 | Smith ..................... | B29C 67/20 416/241 A |
| 2010/0230575 A1 | * | 9/2010 | Mironov ................. | B29C 33/02 249/78 |
| 2014/0166208 A1 | * | 6/2014 | Schubiger .......... | B29C 66/1122 156/468 |

(Continued)

FOREIGN PATENT DOCUMENTS

| | | |
|---|---|---|
| JP | H07-228291 A | 8/1995 |
| JP | 2014-136418 A | 7/2014 |

(Continued)

*Primary Examiner* — Matthew J Daniels
(74) *Attorney, Agent, or Firm* — Oblon, McClelland, Maier & Neustadt, L.L.P.

(57) ABSTRACT

A method for manufacturing a joined body according to an embodiment of the present disclosure is a method for manufacturing a joined body in which composite materials in which fibers are impregnated with resins are heated and joined to each other. The method includes: a step of aligning the composite material with each of a plurality of molding dies, heating the molding dies, and semi-curing the resins of the composite materials; and a step of joining the composite materials to each other by combining and heating the molding dies with which the composite materials are aligned after semi-curing the resins of the composite materials. The molding dies used when semi-curing the resins of the composite materials and the molding dies used when joining the composite materials to each other are the same.

4 Claims, 4 Drawing Sheets

(56) References Cited

U.S. PATENT DOCUMENTS

| | | |
|---|---|---|
| 2015/0367559 A1 | 12/2015 | Hattori et al. |
| 2020/0078990 A1 | 3/2020 | Sana |
| 2022/0242070 A1 | 8/2022 | Akiyama et al. |

FOREIGN PATENT DOCUMENTS

| | | |
|---|---|---|
| JP | 2018-89825 A | 6/2018 |
| JP | 2021-14093 A | 2/2021 |

* cited by examiner

FIG. 1
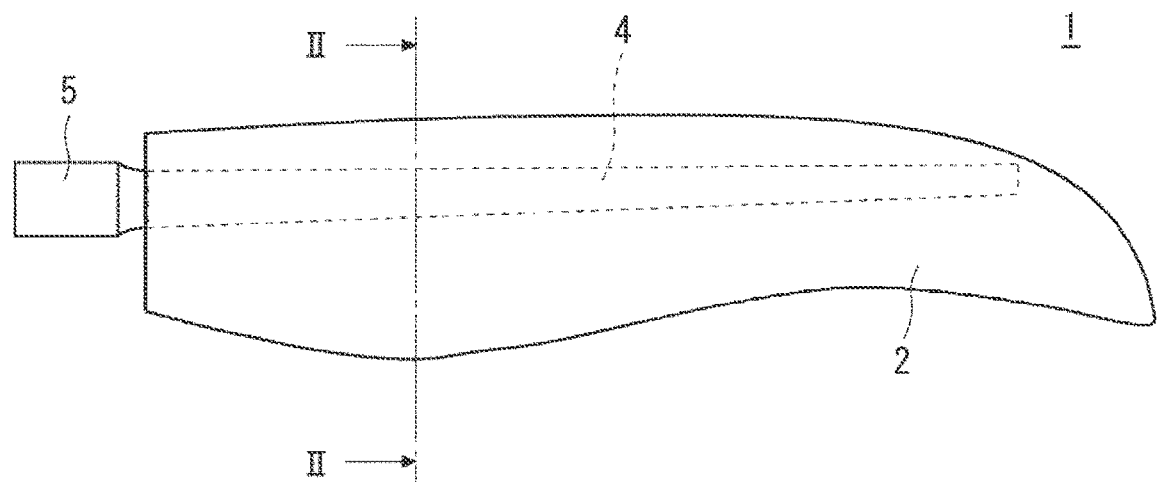
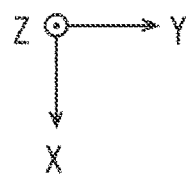

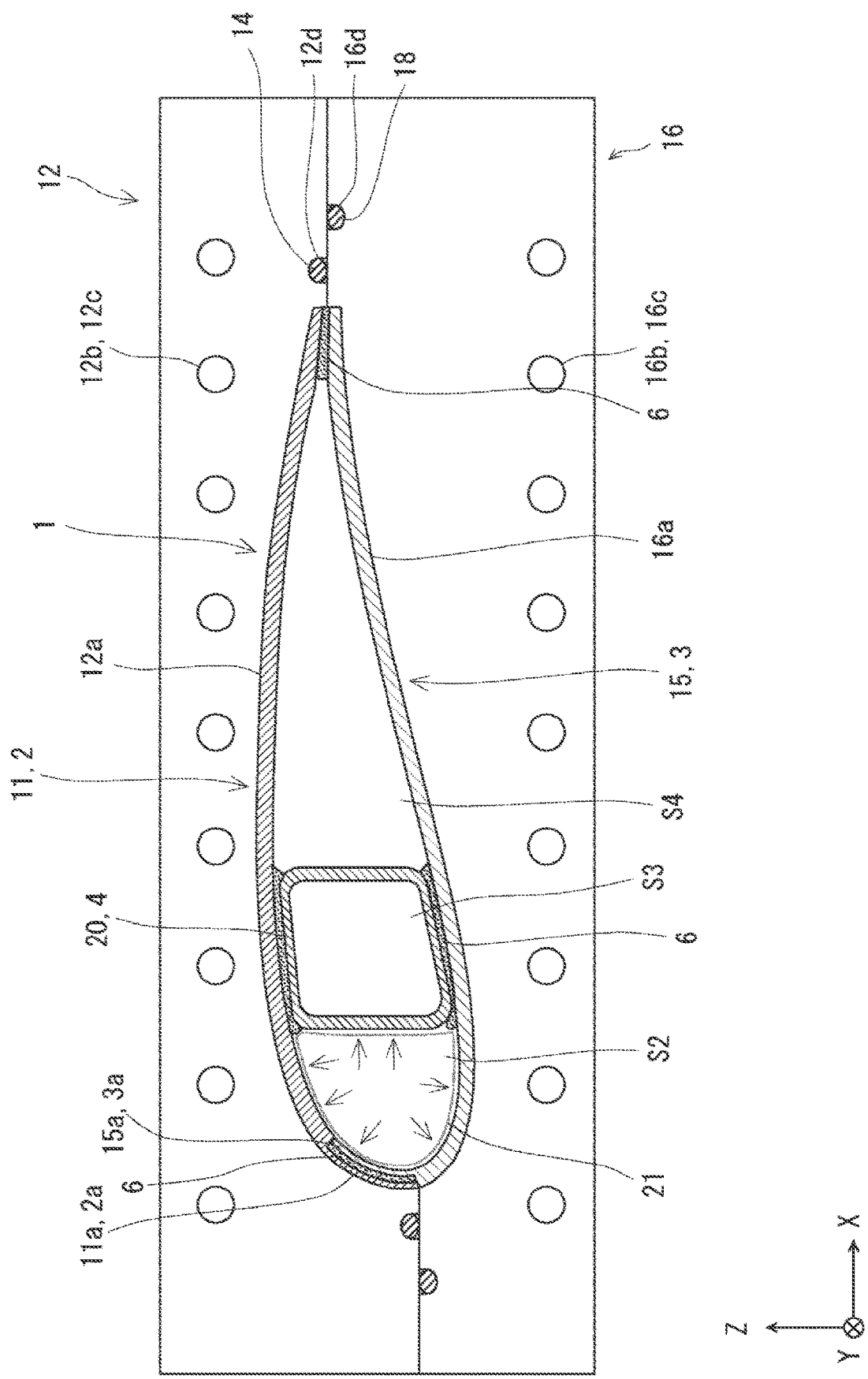

METHOD FOR MANUFACTURING JOINED BODY

CROSS-REFERENCE TO RELATED APPLICATION

This application claims priority to Japanese Patent Application No. 2022-114536 filed on Jul. 19, 2022 incorporated herein by reference in its entirety.

BACKGROUND

1. Technical Field

The present disclosure relates to a method for manufacturing a joined body.

2. Description of Related Art

Molded articles of composite materials in which fibers are impregnated with resin (for example, prepregs) are often used for parts of aircrafts such as an airplane because of their high hardness and light weight. When manufacturing such a molded article, for example, composite materials are joined together to form a joined body.

For example, in the method for manufacturing a joined body of Japanese Unexamined Patent Application Publication No. 2021-14093 (JP 2021-14093 A), a first composite material obtained by curing a resin impregnated in fibers is subjected to a surface treatment to add a polar functional group. Then, a second composite material having fibers impregnated with an uncured resin is laminated on the surface of the first composite material to which the polar functional group is added, and the first composite material is heated together with the second composite material to join the first composite material and the second composite material to each other, thereby manufacturing the joined body.

Here, in the method for manufacturing a joined body of Japanese Unexamined Patent Application Publication No. 2014-136418 (JP 2014-136418 A), a first composite material in which fibers are impregnated with a semi-cured resin, which is formed by a resin transfer molding (RTM) method, is placed via an adhesive on a second composite material in which fibers are impregnated with an uncured resin, and the first composite material and the second composite material are heated and joined via an adhesive, thereby manufacturing the joined body.

SUMMARY

The applicant has found the following issues. In recent years, in order to shorten the manufacturing period of the joined body, as in the manufacturing method of the joined body of JP 2014-136418 A, the resin of the composite material may be semi-cured as a pretreatment for the joining step.

In such a case, generally, the molding die used for semi-curing the resin of the composite material is different from the molding die used in the joining step. Therefore, there is a problem that the manufacturing of the joined body becomes complicated.

The present disclosure has been made in view of such a problem, and achieves a method for manufacturing a joined body that contributes to simplification of manufacturing of the joined body.

A method for manufacturing a joined body according to an embodiment of the present disclosure is a method for manufacturing a joined body in which composite materials in which fibers are impregnated with resins are heated and joined to each other. The method includes: a step of aligning the composite material with each of a plurality of molding dies, heating the molding dies, and semi-curing the resins of the composite materials; and a step of joining the composite materials to each other by combining and heating the molding dies with which the composite materials are aligned after semi-curing the resins of the composite materials. The molding dies used when semi-curing the resins of the composite materials and the molding dies used when joining the composite materials to each other are the same.

According to the present disclosure, it is possible to realize a method for manufacturing a joined body that contributes to simplification of manufacturing the joined body.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram of a wing manufactured by a method for manufacturing a joined body according to an embodiment, viewed from the Z-axis+side;

FIG. 4 is a cross-sectional view showing how the first composite material and the second composite material are joined to each other.

DETAILED DESCRIPTION OF EMBODIMENTS

Hereinafter, a specific embodiment to which the present disclosure is applied will be described in detail with reference to the drawings. However, the present disclosure is not limited to the following embodiment. The following description and drawings are simplified as appropriate for the sake of clarity.

First, the configuration of a joined body manufactured by the method for manufacturing a joined body according to the present embodiment will be described. In the present embodiment, a wing of an aircraft is manufactured as a joined body. In the following description, in order to clarify the description, a three-dimensional (XYZ) coordinate system will be used.

Figure 2:
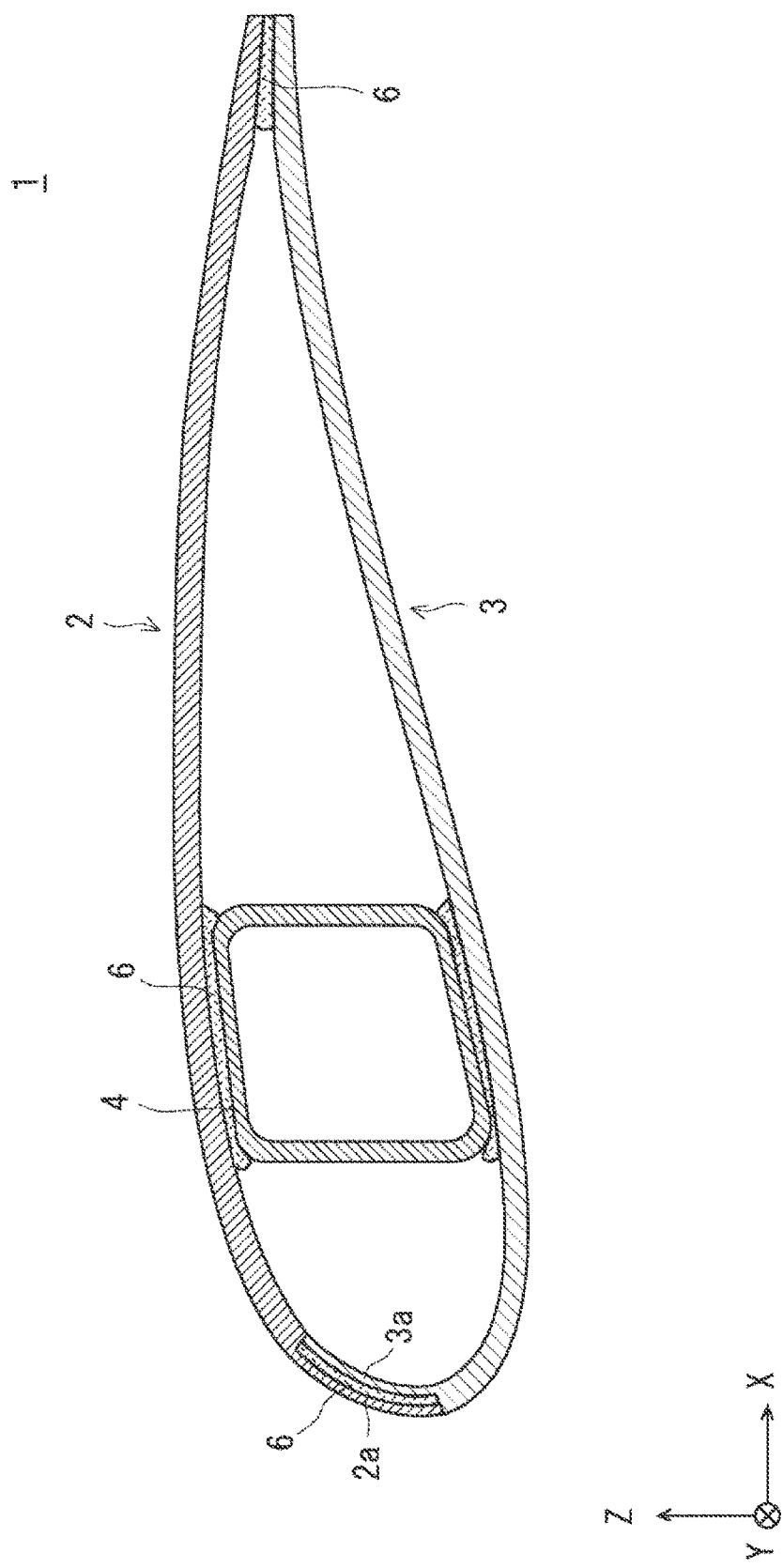
FIG. 2 is a cross-sectional view taken along line II-II in FIG. 1.

FIG. 1 is a diagram of a wing manufactured by a method for manufacturing a joined body according to the present embodiment, viewed from the Z-axis+side. FIG. 2 is a cross-sectional view taken along line II-II in FIG. 1. A wing 1 includes a first outer skin 2, a second outer skin 3, a spar 4, a sleeve 5 and an adhesive member 6, as shown in FIGS. 1 and 2.

The first outer skin 2 is made of a composite material in which fibers are impregnated with resin and cured, and constitutes the outer skin of the wing 1 on the Z-axis+side, as shown in FIGS. 1 and 2. A notch portion 2a is provided at the end portion of the first outer skin 2 on the X-axis−side. The notch portion 2a is curved to protrude toward the X-axis−side when viewed from the Y-axis direction.

The second outer skin 3 is made of a composite material in which fibers are impregnated with resin and cured, and constitutes the outer skin of the wing 1 on the Z-axis−side, as shown in FIG. 2. From the end portion of the second outer skin 3 on the X-axis–side, a protruding portion 3a that fits into the notch portion 2a of the first outer skin 2 protrudes toward the Z-axis+side. The protruding portion 3a has a shape aligning with that of the notch portion 2a, and is curved to protrude toward the X-axis–side when viewed from the Y-axis direction.

The spar 4 is made of, for example, a composite material in which fibers are impregnated with resin and cured, and constitutes a reinforcing member of the wing 1. As shown in FIG. 2, the spar 4 has a substantially rectangular columnar hollow shape when viewed from the Y-axis direction. As shown in FIG. 1, the sleeve 5 is fixed to the end portion of the spar 4 on the Y-axis–side, and serves as a connecting portion for connecting the spar 4 to a drive shaft of the wing 1, for example. The sleeve 5 has, for example, a cylindrical shape, and the hollow portion of the spar 4 and the hollow portion of the sleeve 5 are continuous in the Y-axis direction.

The adhesive member 6 is, for example, an adhesive sheet as shown in FIG. 2. The adhesive member 6 is disposed between the notch portion 2a of the first outer skin 2 and the protruding portion 3a of the second outer skin 3 to join the notch portion 2a of the first outer skin 2 and the protruding portion 3a of the second outer skin 3 to each other.

The adhesive member 6 is disposed between the end portion of the first outer skin 2 on the X-axis+side and the end portion of the second outer skin 3 on the X-axis+side to join the end portion of the first outer skin 2 on the X-axis+side and the end portion of the second outer skin 3 on the X-axis+side to each other. In addition, the adhesive member 6 is disposed between the first outer skin 2 and the spar 4 and between the second outer skin 3 and the spar 4 to join the first outer skin 2 and the second outer skin 3 to each other via the spar 4 and the adhesive member 6.

Next, a method for manufacturing the wing 1 of the present embodiment will be described. In the present embodiment, the first molding die used to semi-cure the resin impregnated in the fibers of the first composite material forming the first outer skin 2 and the second molding die used to semi-cure the resin impregnated in the fibers of the second composite material forming the second outer skin 3 are the same as the first molding die and the second molding die used to join the first composite material and the second composite material by curing the adhesive member 6 while curing the semi-cured resin in the first composite material and curing the semi-cured resin in the second composite material.

First, the flow of semi-curing the resin of the first composite material forming the first outer skin 2 and the resin of the second composite material forming the second outer skin 3 will be described. Here, the first composite material and the second composite material are, for example, general prepregs, and fibers are impregnated with resin.

The fibers are formed by braiding, weaving, or knitting fibers such as carbon fibers, aramid fibers, nylon fibers, polyester fibers, or glass fibers, or any combination thereof. Resins include thermosetting resins such as epoxy resins, bismaleimide resins, vinyl ester resins, unsaturated polyester resins, phenolic resins, or silicone resins.

Figure 3:
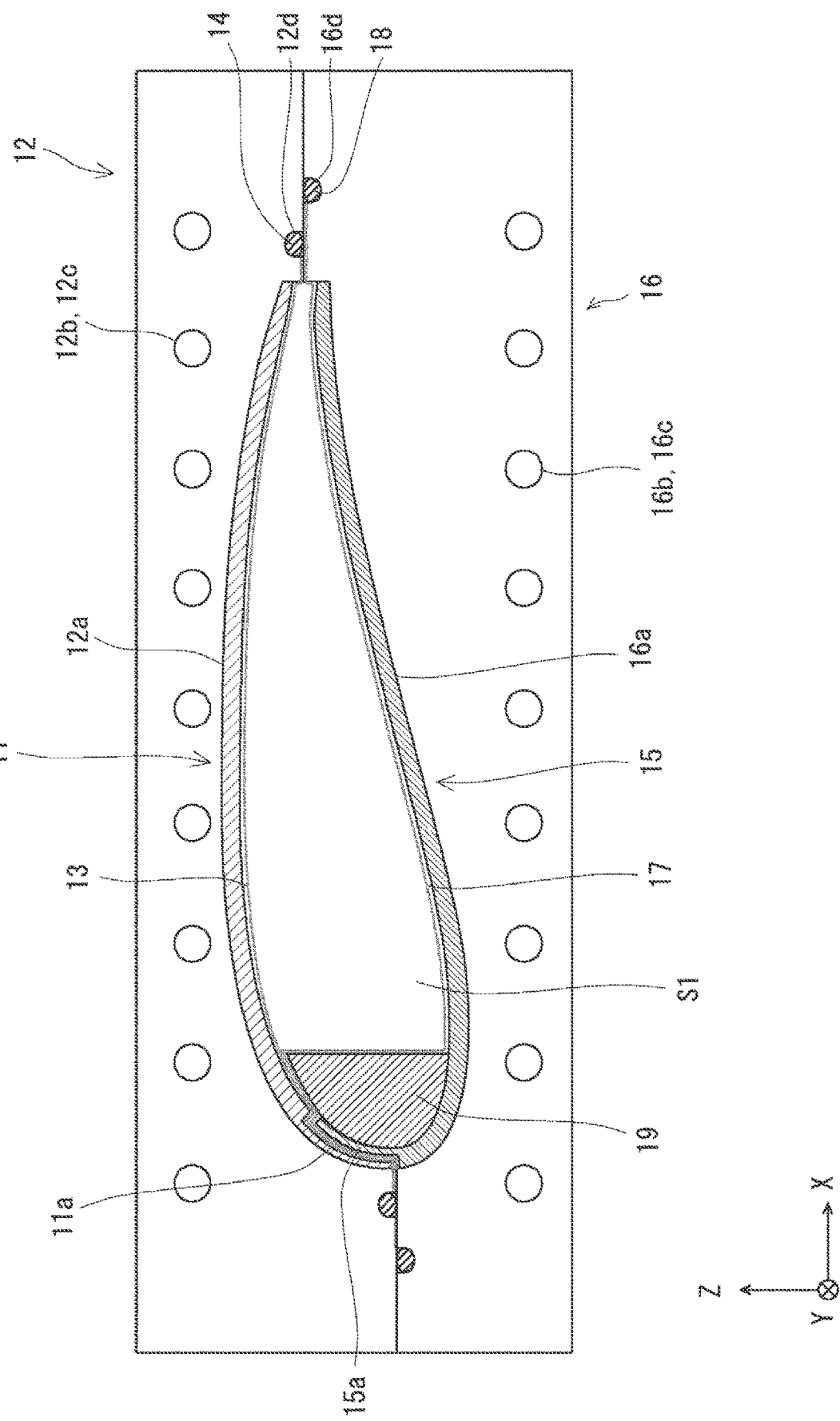
FIG. 3 is a cross-sectional view showing how a resin of a first composite material and a resin of a second composite material are semi-cured.

FIG. 3 is a cross-sectional view showing how the resin of the first composite material and the resin of the second composite material are semi-cured. In FIG. 3, the hatching indicating cross-sectional portions of the first molding die and the second molding die is omitted for clarity of illustration.

First, as shown in FIG. 3, while the first composite material 11 is aligned with a cavity surface 12a of a first molding die 12, the portion 11a forming the notch portion 2a of the first outer skin 2 is formed. At this time, the cavity surface 12a of the first molding die 12 has a recess having a shape substantially equal to the outer surface shape of the first outer skin 2. A heating portion 12b is built in the first molding die 12.

For example, as shown in FIG. 3, the heating portion 12b includes a penetration portion 12c that penetrates the first molding die 12, and the penetration portion 12c is supplied with a heated liquid or gas as a heat medium. Therefore, the heating portion 12b directly heats the first molding die 12 with the heat medium supplied to the penetration portion 12c.

With the first composite material 11 aligned with the cavity surface 12a of the first molding die 12 in this way, as shown in FIG. 3, the first composite material 11 is disposed so that the peripheral edge portion of the first composite material 11 on the Z-axis– side substantially coincides with the peripheral edge portion of the cavity surface 12a of the first molding die 12 on the Z-axis–side.

Next, as shown in FIG. 3, the first composite material 11 is covered with a packing sheet 13 and packed. At this time, it is preferable to fit the peripheral edge portion of the packing sheet 13 into the groove 12d provided in the first molding die 12 via the packing 14 so as to surround the cavity surface 12a of the first molding die 12.

On the other hand, as shown in FIG. 3, while the second composite material is aligned with a cavity surface 16a of a second molding die 16, the portion 15a forming the protruding portion 3a of the second outer skin 3 is formed. At this time, the cavity surface 16a of the second molding die 16 has a recess having a shape substantially equal to the outer surface shape of the second outer skin 3. A heating portion 16b is built in the second molding die 16.

For example, as shown in FIG. 3, the heating portion 16b includes a penetration portion 16c that penetrates the second molding die 16, and the penetration portion 16c is supplied with a heated liquid or gas as a heat medium. Therefore, the heating portion 16b directly heats the second molding die 16 with the heat medium supplied to the penetration portion 16c.

With the second composite material 15 aligned with the cavity surface 16a of the second molding die 16 in this way, as shown in FIG. 3, the second composite material is disposed so that the portion 15a forming the protruding portion 3a of the second outer skin 3 in the second composite material 15 protrudes from the end portion of the second molding die 16 on the X-axis–side toward the Z-axis+side, and so that the peripheral edge portion of the portion forming the outer surface of the second outer skin 3 in the second composite material 15 on the Z-axis+side substantially coincides with the peripheral edge portion of the cavity surface 16a of the second molding die 16 on the Z-axis+side.

Next, as shown in FIG. 3, the second composite material 15 is covered with a packing sheet 17 and packed. At this time, it is preferable to fit the peripheral edge portion of the packing sheet 17 into the groove 16d provided in the second molding die 16 via the packing 18 so as to surround the cavity surface 16a of the second molding die 16.

Further, when packing the second composite material 15, in order to hold the portion 15a forming the protruding portion 3a of the second outer skin 3 in the second composite material 15 in a predetermined shape, as shown in FIG. 3, the portion 15a forming the protruding portion 3a of the second outer skin 3 in the second composite material 15 is preferably supported from the X-axis+side by a pressing member 19 such as a mandrel.

At this time, when the second composite material 15 is packed, as shown in FIG. 3, the packing sheet 17 covers the portion 15*a* forming the protruding portion 3*a* of the second outer skin 3 in the second composite material 15, the pressing member 19, and the area where the pressing member 19 is not disposed within the portion forming the outer surface of the second outer skin 3 in the second composite material 15.

Next, as shown in FIG. 3, the cavity surface 12*a* of the first molding die 12 and the cavity surface 16*a* of the second molding die 16 are disposed so as to face each other in the Z-axis direction and combined (that is, mold clamping).

Then, a heat medium is supplied to the penetration portion 12*c* of the heating portion 12*b* in the first molding die 12 and the penetration portion 16*c* of the heating portion 16*b* in the second molding die 16 to heat the first molding die 12 and the second molding die 16, thereby semi-curing the resin of the first composite material 11 and the resin of the second composite material 15.

Thus, since the heating portions 12*b* and 16*b* are built in the first molding die 12 and the second molding die 16 of the present embodiment, the first molding die 12 and the second molding die 16 can be directly heated as compared to the case where the first molding die 12 and the second molding die 16 are indirectly heated as in autoclave molding (that is, heating from the outside of the first molding die 12 and the second molding die 16). Therefore, the temperatures of the first molding die 12 and the second molding die 16 are easily controlled.

Here, the semi-cured state is a state in which functional groups remain on the surfaces of the first composite material 11 and the second composite material 15, and is, for example, a state where the curing degrees of the resin of the first composite material 11 and the resin of the second composite material 15 are about 60% to 80% (preferably 70%).

However, the curing degrees of the resin of the first composite material 11 and the resin of the second composite material 15 may be set appropriately in consideration of the material of the resin of the first composite material 11, the resin of the second composite material 15, and the adhesive member 6, and the degree of occurrence of wrinkles in the first composite material 11 and the second composite material 15. The curing degree can be measured, for example, based on a heat flow curve obtained by differential scanning calorimetry (DSC).

At this time, the packing sheets 13 and 17 are preferably evacuated through vacuum holes (not shown) formed in the first molding die 12 and the second molding die 16, respectively. Thus, the generation of voids or the like in the first composite material 11 and the second composite material 15 can be suppressed.

By pressurizing the space S1 surrounded by the first composite material 11, the second composite material 15, and the pressing member 19, and by pushing the pressing member 19 toward the X-axis−side, the displacement of the pressing member 19 toward the X-axis+side is preferably suppressed. As a result, the portion 15*a* forming the protruding portion 3*a* of the second outer skin 3 in the second composite material 15 can be held in a predetermined shape. Alternatively, an inner bag or the like may be disposed in the space S1, and the pressing member 19 may be pushed toward the X-axis−side by supplying gas to the inner bag.

After that, when the combined state of the first molding die 12 and the second molding die 16 is released and the packing sheets 13 and 17 are removed, the step of semi-curing the resin of the first composite material 11 and the resin of the second composite material 15 is completed.

Next, the flow of joining the first composite material 11 and the second composite material 15 to each other will be described. FIG. 4 is a cross-sectional view showing how the first composite material and the second composite material are joined to each other. In FIG. 4, the hatching indicating cross-sectional portions of the first molding die and the second molding die is omitted for clarity of illustration.

First, a third composite material 20 in which fibers are impregnated with resin is separately formed into the shape of the spar 4 and heated to semi-cure the resin of the third composite material 20. Then, the sleeve 5 is fixed to the end portion of the third composite material 20 on the Y-axis−side.

Next, as shown in FIG. 4, the packing 14 is fitted into the groove 12*d* of the first molding die 12 with the first composite material 11, in which the resin is semi-cured, aligned with the cavity surface 12*a*, and the packing 18 is fitted into the groove 16*d* of the second molding die 16 with the second composite material 15, in which the resin is semi-cured, aligned with the cavity surface 16*a*. Then, while combining the first molding die 12 and the second molding die 16, the third composite material 20 is interposed at a predetermined position between the first composite material 11 and the second composite material 15. Note that either the packing 14 or the packing 18 may be omitted.

At this time, the third composite material 20 extends in the Y-axis direction between the first composite material 11 and the second composite material 15, and for example, the end portion of the third composite material 20 on the Y-axis+side is disposed in an open state in a space surrounded by the first composite material 11 and the second composite material 15. The sleeve 5 is housed in a housing portion formed in the first molding die 12 and the second molding die 16.

The portion 15*a* forming the protruding portion 3*a* of the second outer skin 3 in the second composite material 15 is fitted into the portion 11*a* forming the notch portion 2*a* of the first outer skin 2 in the first composite material 11, and the adhesive member 6 is interposed between the portion 11*a* forming the notch portion 2*a* of the first outer skin 2 in the first composite material 11 and the portion 15*a* forming the protruding portion 3*a* of the second outer skin 3 in the second composite material 15.

At the same time, the adhesive member 6 is interposed between the portion of the first composite material 11 on the X-axis+side and the portion of the second composite material 15 on the X-axis+side. In addition, the adhesive member 6 is interposed between the first composite material 11 and the third composite material 20 and between the second composite material 15 and the third composite material 20.

Here, the adhesive member 6 preferably has the same functional group as the resin of the first composite material 11, the resin of the second composite material 15, and the resin of the third composite material 20. In addition, a surface treatment for adding functional groups, such as plasma treatment or corona treatment, is preferably applied in the area in contact with the adhesive member 6 in the first composite material 11, the area in contact with the adhesive member 6 in the second composite material 15, and the area in contact with the adhesive member 6 in the third composite material 20.

Then, a heat medium is supplied to the penetration portion 12*c* of the heating portion 12*b* in the first molding die 12 and the penetration portion 16*c* of the heating portion 16*b* in the second molding die 16 to heat the first molding die 12 and the second molding die 16. While completely curing the resin of the first composite material 11 and the resin of the second composite material 15 in this way, the adhesive member 6 is cured to join the first composite material 11, the second composite material 15, and the third composite material 20 to each other. In the present embodiment, the step of completely curing the resin of the first composite material 11 and the resin of the second composite material 15, and the step of curing the adhesive member 6 are simultaneously performed. However, for example, a step of completely curing the resin of the first composite material 11 and the resin of the second composite material 15 may be performed after the step of curing the adhesive member 6, as different steps.

As a result, the wing 1 can be manufactured in which the first outer skin 2, the second outer skin 3, and the spar 4 are joined together. Thus, in the present embodiment, after the resin of the first composite material 11, the resin of the second composite material 15, and the resin of the third composite material 20 are semi-cured, the third composite material 20 is interposed between the first composite material 11 and the second composite material 15 for joining.

Therefore, for example, compared to the case where the first composite material 11, the second composite material 15, and the third composite material 20 are molded and joined to each other by autoclave molding or the like, the occurrence of wrinkles in the first composite material 11, the second composite material 15, and the third composite material 20 can be suppressed.

Further, when the resin of the first composite material 11, the resin of the second composite material 15, and the resin of the third composite material 20 are in a semi-cured state, functional groups remain on the surface of the first composite material 11, the second composite material 15, and the third composite material 20. Therefore, compared to the case where the resin of the first composite material 11, the resin of the second composite material 15, and the resin of the third composite material 20 are in a completely cured state, the first composite material 11 and the second composite material 15, the first composite material 11 and the third composite material 20, and the second composite material 15 and the third composite material 20 can be firmly joined together with a small amount of the adhesive member 6, and as a result, the wing 1 can be made lighter.

Moreover, since the resin of the third composite material 20 is in a semi-cured state, the third composite material 20 can be deformed when interposed between the first composite material 11 and the second composite material 15, and variations such as molding variations and dimensional variations of the third composite material 20 can be absorbed.

Further, as described above, since the heating portions 12b and 16b are built in the first molding die 12 and the second molding die 16, the first molding die 12 and the second molding die 16 can be directly heated as compared to the case where the first molding die 12 and the second molding die 16 are indirectly heated as in autoclave molding. Therefore, the temperatures of the first molding die 12 and the second molding die 16 are easily controlled.

Further, when the adhesive member 6 has the same functional group as the resin of the first composite material 11, the resin of the second composite material 15, and the resin of the third composite material 20, the joining force between the first composite material 11 and the second composite material 15, between the first composite material 11 and the third composite material 20, and between the second composite material 15 and the third composite material 20 can be improved compared to the case where the adhesive member 6 has a different functional group from the resin of the first composite material 11, the resin of the second composite material 15, and the resin of the third composite material 20.

In addition, when surface treatment such as plasma treatment or corona treatment for adding functional groups is performed on the area of the first composite material 11 in contact with the adhesive member 6, the area of the second composite material in contact with the adhesive member 6, and the area of the third composite material 20 in contact with the adhesive member 6, the joining force between the first composite material 11 and the second composite material 15, between the first composite material 11 and the third composite material 20, and between the second composite material 15 and the third composite material 20 can be further improved.

Here, as shown in FIG. 4, an inner bag 21 is disposed in the space S2 on the X-axis−side surrounded by the first composite material 11, the second composite material 15, and the third composite material 20, and by pressuring the inner bag 21, the portion 15a forming the protruding portion 3a of the second outer skin 3 in the second composite material is preferably pressed against the portion 11a forming the notch portion 2a of the first outer skin 2 in the first composite material 11.

As a result, it is possible to suppress the occurrence of peeling of the adhesive member 6 between the portion 11a forming the notch portion 2a of the first outer skin 2 in the first composite material 11 and the portion 15a forming the protruding portion 3a of the second outer skin 3 in the second composite material 15.

At this time, the space S3 inside the third composite material 20 and the space S4 on the X-axis+side surrounded by the first composite material 11, the second composite material 15, and the third composite material 20 are pressurized, so that the displacement of the third composite material 20 toward the X-axis+side due to the pressurization of the inner bag 21 is preferably suppressed.

It is preferable to supply the gas to the spaces S3 and S4 through the sleeve 5 and the third composite material 20 via a gas supply hole formed in the first molding die 12 or the second molding die 16 so as to communicate with the housing portion of the first molding die 12 or the second molding die 16, in which the sleeve 5 is housed.

As described above, in the method for manufacturing the wing 1 of the present embodiment, the first molding die 12 and the second molding die 16 used when the resin of the first composite material 11 and the resin of the second composite material 15 are semi-cured and the first molding die 12 and the second molding die 16 used when joining the first composite material 11 and the second composite material 15 to each other are the same. Therefore, the manufacturing of the wing 1 can be simplified compared to the case where different molding dies are used in the step of semi-curing the resin and in the step of joining the composite materials to each other.

Moreover, when the heating portions 12b and 16b are built in the first molding die 12 and the second molding die 16, the first molding die 12 and the second molding die 16 can be directly heated as compared to the case where the first molding die 12 and the second molding die 16 are indirectly heated as in autoclave molding. Therefore, the temperatures of the first molding die 12 and the second molding die 16 are easily controlled, and the manufacturing of the wing 1 can be facilitated.

Further, when the adhesive member 6 has the same functional group as the resin of the first composite material 11, the resin of the second composite material 15, and the resin of the third composite material 20, the joining force between the first composite material 11 and the second composite material 15, between the first composite material 11 and the third composite material 20, and between the second composite material 15 and the third composite material 20 can be improved compared to the case where the adhesive member 6 has different functional groups from the resin of the first composite material 11, the resin of the second composite material 15, and the resin of the third composite material 20.

The present disclosure is not limited to the above embodiment, and can be appropriately modified without departing from the spirit thereof.

For example, in the above embodiment, the resin of the third composite material 20 is semi-cured and interposed between the first composite material 11 and the second composite material 15, but the resin of the third composite material 20 may be completely cured and interposed between the first composite material 11 and the second composite material 15.

For example, in the above embodiment, the configuration in which the inner bag 21 is disposed in the space S2 when joining the first composite material 11, the second composite material 15, and the third composite material 20 to each other is described. However, a pressing member such as a mandrel having a larger coefficient of thermal expansion than that of the first molding die 12 and the second molding die 16 may be disposed in the space S2.

For example, although the adhesive member 6 in the above embodiment is configured by an adhesive sheet, the adhesive member 6 is not limited to an adhesive sheet, and a paste-type or film-shaped adhesive member used when joining composite molded articles can be used. When the composite materials can be joined to each other with the resin of the composite materials, the adhesive member 6 may be omitted.

For example, in the above embodiment, the heating portion 12b of the first molding die 12 and the heating portion 16b of the second molding die 16 are configured to apply heat by supplying gas or liquid as a heat medium. However, any configuration that can directly heat the first molding die 12 and the second molding die 16 may be used, and for example, a heater with heating wires embedded in the first molding die 12 and the second molding die 16 may be provided.

For example, in the above embodiment, the wing 1 is manufactured as a joined body, but any joined body manufactured by joining composite materials to each other may be used. Therefore, the number of composite materials and molding dies can be changed as appropriate according to the shape of the joined body. Further, depending on the shape of the joined body, it is not necessary to combine a plurality of molding dies when semi-curing the resin of the composite material.

What is claimed is:

1. A method for manufacturing a joined body in which composite materials in which fibers are impregnated with resins are heated and joined to each other, the method comprising:
    a step of semi-curing the resins of the composite materials by aligning the composite material with each of a plurality of molding dies and heating the molding dies, the molding dies including a first molding die and a second molding die, and the composite materials include a first composite material and a second composite material;
    a step of joining the composite materials to each other by combining and heating the molding dies with which the composite materials are aligned after semi-curing the resins of the composite materials, wherein the molding dies used when semi-curing the resins of the composite materials and the molding dies used when joining the composite materials to each other are the same;
    a step of assembling the molding dies after the composite materials are aligned with the corresponding one of the molding dies and before heating the molding dies to semi-cure the resins of the composite materials;
    a step of releasing a combined state of the molding dies after the resins of the composite materials are semi-cured;
    a step of interposing a reinforcing member between the composite materials facing each other when the molding dies are combined to join the composite materials to each other, the reinforcing member including a third composite material formed into a predetermined shape with a resin impregnated in fibers in a semi-cured state or a completely cured state;
    a step of reassembling the molding dies before joining the composite materials and the reinforcing member; and
    a step of joining the composite materials and the reinforcing member to each other when the molding dies are heated to join the first composite material, the second composite material and the third composite materials to each other.

2. The method according to claim 1, wherein
    a heating portion for heating the molding die is built in each of the molding dies, and
    when heating the molding dies, the heating portion heats the molding dies.

3. The method according to claim 1, comprising a step of interposing an adhesive member between the composite materials to be joined to each other, wherein the resins of the composite materials and the adhesive member have the same functional groups.

4. The method according to claim 1, wherein the joined body is a wing of an aircraft.

* * * * *